United States Patent [19]

Zdenek et al.

[11] Patent Number: 5,461,668

[45] Date of Patent: * Oct. 24, 1995

[54] TELEPHONIC CONSOLE WITH PROGRAMMABLE NONVOLATILE PERSONALITY MEMORY AND METHOD

[76] Inventors: John M. Zdenek, 289 Blackhawk Rd., Riverside, Ill. 60546; David A. Marcinkiewicz, 711 Lancaster La., Geneva, Ill. 60134; Earl L. Smith, 6318 Fairmount, Downers Grove, Ill. 60516

[ * ] Notice: The portion of the term of this patent subsequent to Dec. 6, 2011 has been disclaimed.

[21] Appl. No.: 927,896

[22] Filed: Aug. 7, 1992

[51] Int. Cl.$^6$ ..................................................... H04M 1/00
[52] U.S. Cl. .......................... 379/267; 379/265; 379/357
[58] Field of Search ..................................... 379/308, 309, 379/265, 266, 267, 357, 201, 96, 387, 390

[56] References Cited

U.S. PATENT DOCUMENTS

| | | | |
|---|---|---|---|
| 4,744,103 | 11/1988 | Dahlquist et al. | 379/265 |
| 4,759,056 | 7/1988 | Akiyama | 379/216 |
| 4,897,866 | 1/1990 | Majmudar et al. | 379/96 |
| 4,928,306 | 5/1990 | Biswas et al. | 379/201 |
| 5,371,785 | 12/1994 | Marankiewicz | 379/267 |

FOREIGN PATENT DOCUMENTS 9112682 8/1991 WIPO .

OTHER PUBLICATIONS

Hsing et al, "An Interactive Touch Phone for Office Automation" IEEE Communications Magazine, Feb. 1985, pp. 21–26.

Matsuo et al, "Personal Telephone Services Using IC–Cards" Jul. 1989, IEEE Communications Magazine pp. 41–48.

*Primary Examiner*—Jeffery A. Hofsass
*Assistant Examiner*—Daniel S. Hunter

[57] ABSTRACT

A telephonic console (10) having a visual display (12) and a keyboard (14) for making manual entries to control the console (10) to perform different functions in conjunction with an automatic call distribution system (14) interconnecting telephonic units (16) of an external network (18) with a plurality of telephone consoles (10), a console personality programming apparatus having a nonvolatile memory (32) within the console storing a personality code associated with one of a plurality of different personalities, a microprocessor (20) for reading the personality code and for controlling the console (10) to function in accordance with the one personality associated with the read code.

12 Claims, 4 Drawing Sheets

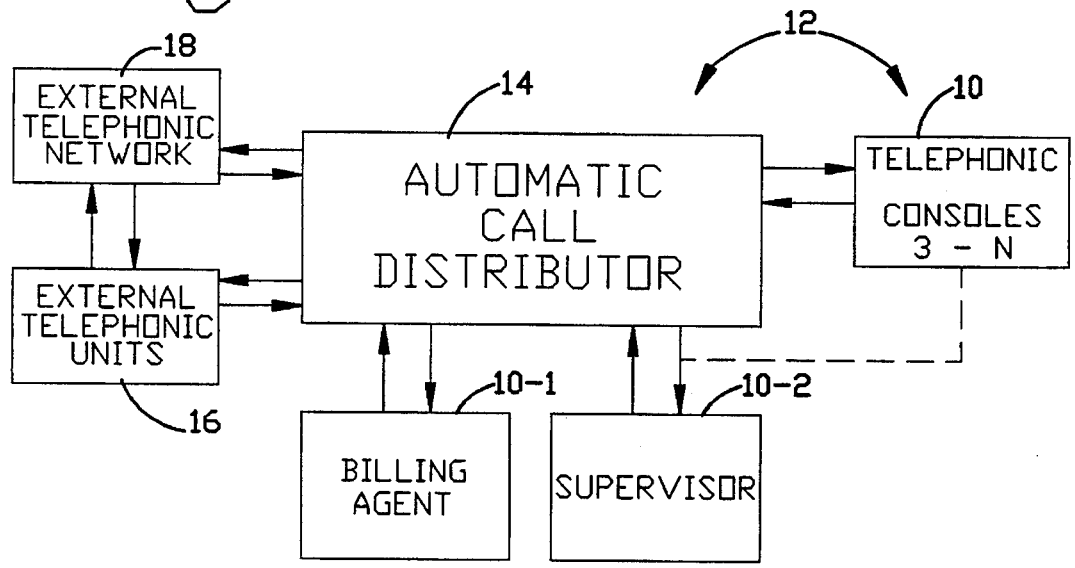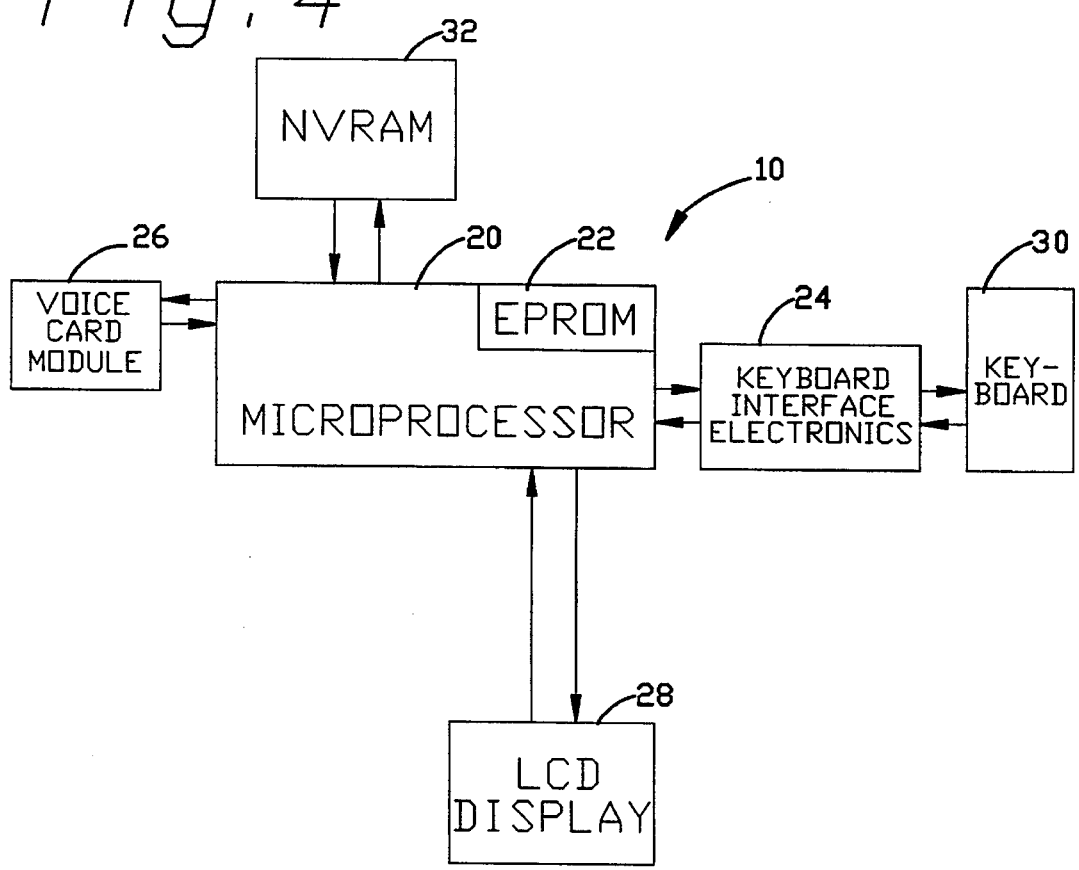

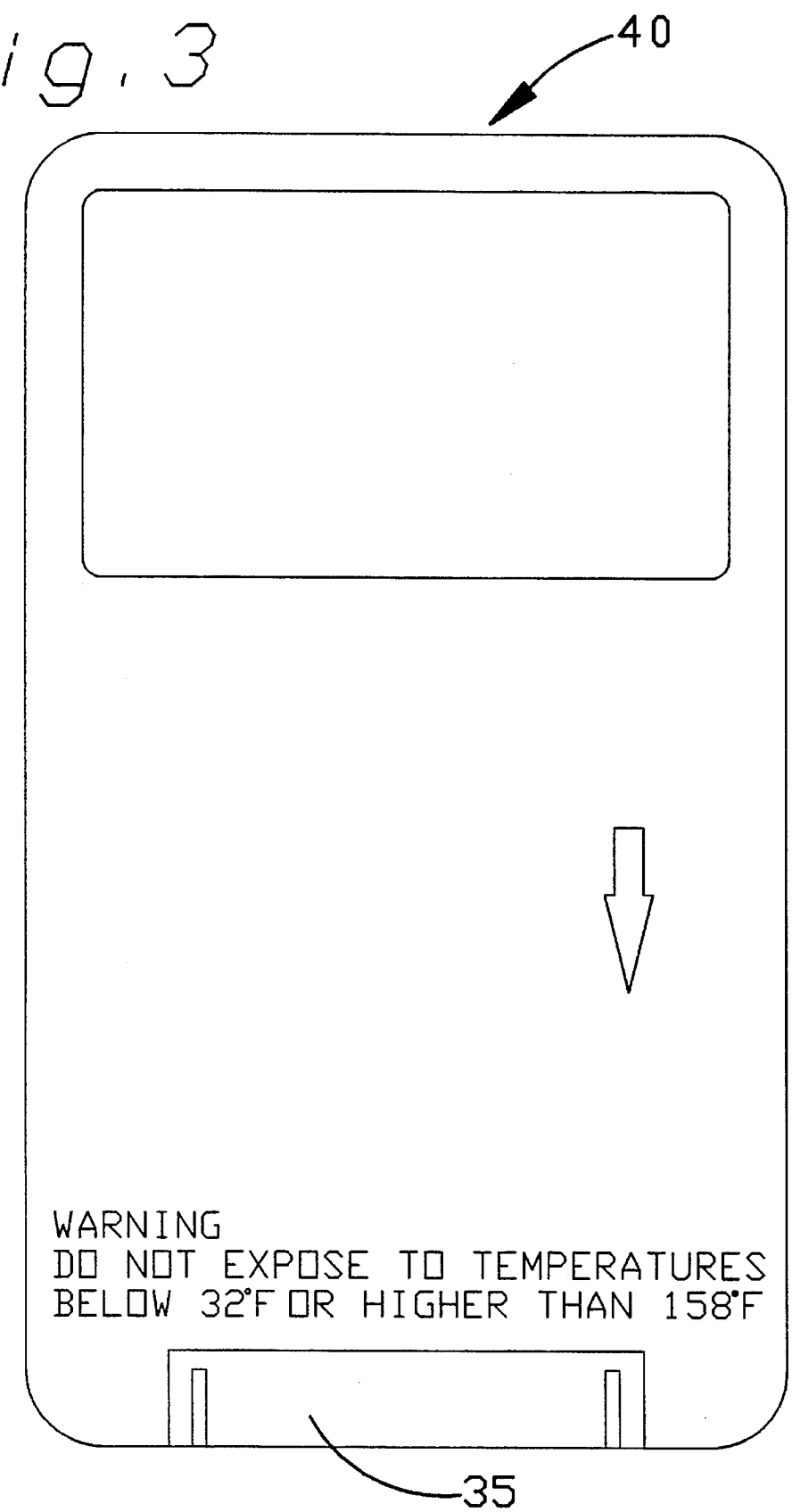

TELEPHONIC CONSOLE WITH PROGRAMMABLE NONVOLATILE PERSONALITY MEMORY AND METHOD

BACKGROUND OF THE INVENTION

1. Field of the Invention

This invention relates to a telephonic console usable in an automatic call distribution system for interconnecting telephonic units of an external network with a plurality of the telephonic consoles and, more particularly, to a telephonic console which is programmable to operate in different modes.

2. Description of the Related Art Including Information Disclosed Under 37 C.F.R. 1.97–1.99

Telephonic consoles of the type having a keyboard and visual display for interfacing with a console microprocessor of the console and with a computer of an automatic distribution system for interconnecting telephonic units of an external network with a plurality of the telephonic consoles are well known. In such call distribution systems there are different types of units that require different operating parameters. These different types of consoles include a service agent console, a supervisory console, a billing console and a station master console.

Each of these different consoles has a different set of relationships between the plurality of individual relatable key switches of the keyboard and the functions performed by the console in response to actuation of the different keys. Also, each different type of console has a different set of relationships between the plurality of individual display elements of the console and a plurality of different conditions of the console and a relationship between actuation of the keys of the keyboard and the response thereto of the individual display elements. Moreover, types of telephonic consoles in such a system also have different sets of capabilities. For instance, while a supervisory console would have the capability of monitoring the voice communications being conducted on one of the agent consoles, an agent console would not have any monitoring capability.

In known systems employing such telephonic consoles, it is necessary to individually construct each of the consoles at the manufacturing facility to function in accordance with one of these different modes of operation. For instance, if a system needs a hundred agent console, two billing agent consoles, and five supervisory consoles, those numbers of the different types of consoles are produced at the production facility and shipped to the user site. If the inventory is short of agent consoles, but has an excess of supervisory consoles, the supervisory consoles cannot be substituted for the agent consoles. Moreover, during installation there are sometimes changes in the design of the system which require less of the different types of agent consoles, but nothing can be done on site to change the consoles to function in different modes of operation to meet the new design requirements.

SUMMARY OF THE INVENTION

It is therefore the principal object of the present invention to provide a telephonic console which has the capacity of selectively functioning in any one of the different modes of operation, or console personalities. So that, instead of constructing different telephonic consoles, each with different characteristics that cannot be changed, a single telephonic console is produced with a programmable nonvolatile memory which can be programmed to control the console to function in any one of the plurality of different modes of operation or personalities.

More specifically, it is an objective to provide, in a telephonic console having a visual display and means for making manual entries to control the console to perform a plurality of different functions in conjunction with an automatic call distribution system for interconnecting telephonic units of an external network with a plurality of the telephonic consoles, a console personality programming apparatus having a nonvolatile memory in the console for storing a personality code associated with one of a plurality of personalities, means for reading the personality code and means responsive to the code reading means for controlling the console to function in accordance with the one personality identified by the read code.

Preferably, the nonvolatile memory for storing the personality code is a programmable nonvolatile memory element which can be changed or reprogrammed readily. Alternatively, initially the nonvolatile memory is caused to store a personality code associated with a selected one of the different personalities, which is automatically read by the controlled microprocessor of the console upon power-up of the console to establish in which of the different modes of operation the console will operate. The microprocessor has associated means which is responsive to the code read from the nonvolatile memory for disabling the console from performing those particular functions not permitted by the personality associated with the read personality identification information.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which:

FIG. 1 is a functional block diagram of an automatic call distribution in which the telephonic consoles of the present invention are preferably employed;

FIG. 3 is a side view of a card preferably used to enable reprogramming of the nonvolatile memory to establish a new personality;

FIG. 4 is a functional block diagram of the telephonic console of FIGS. 1 and 2.

DESCRIPTION OF THE PREFERRED EMBODIMENT

Figure 2:
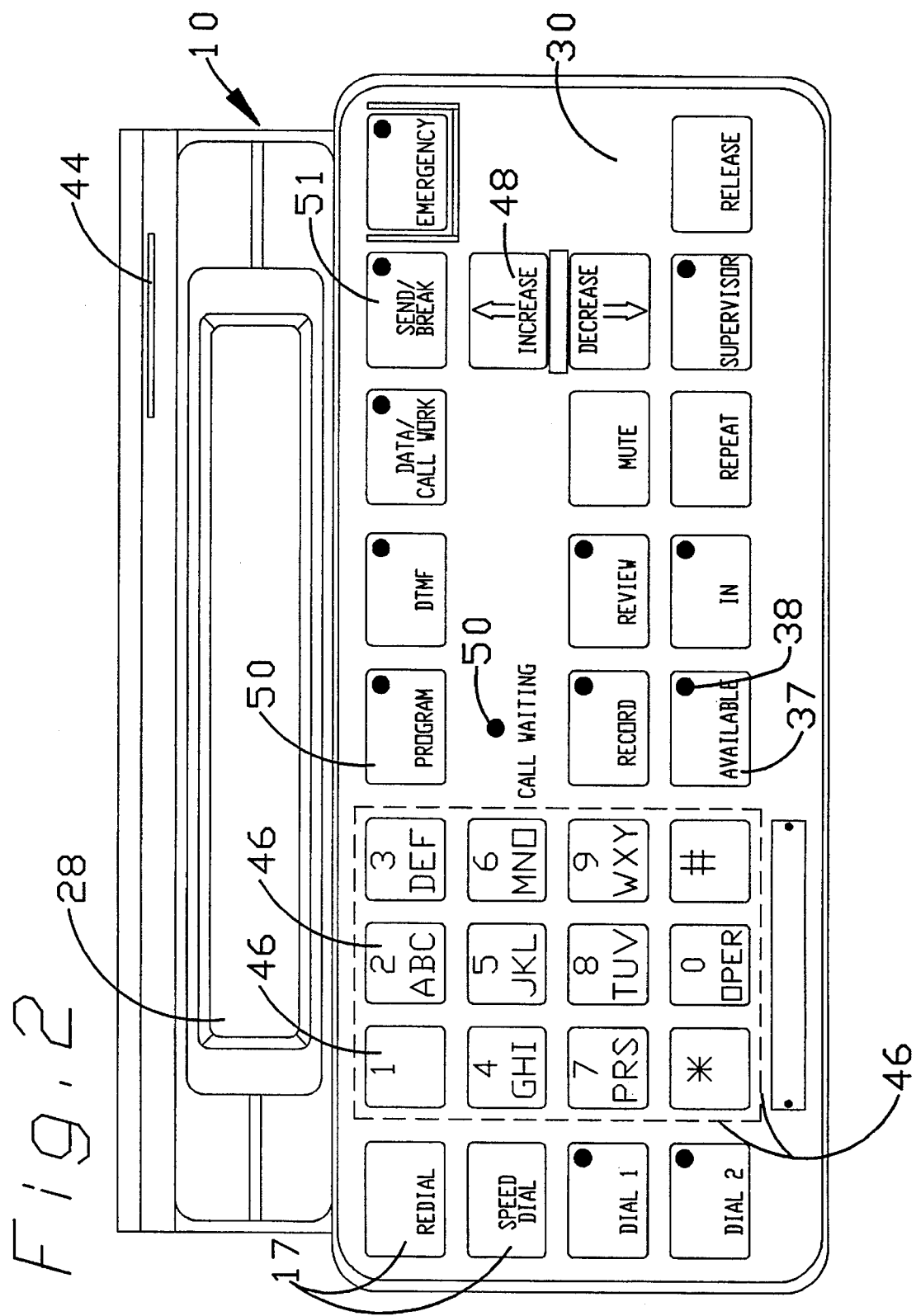
FIG. 2 is a plan view of a preferred embodiment of the telephonic console of the present invention.

Referring to FIG. 1, a plurality of the programmable telephonic consoles 10-1 through 10-N of the present invention, generally designated telephonic consoles, or consoles 10, herein, are seen as used in an automatic call distribution system 12. The system 12 has an automatic call distributor 14 which interconnects incoming calls from external telephonic unit 16 of an external network 18 with at least some of the plurality of telephonic consoles 10. The automatic call distributor, or ACD 14, includes a multiport, multiplexing telephonic switch, a central processing unit and an associated memory, not shown. The details of the ACD forms no part of the invention, but reference should be made to U.S. Pat. No. 5,268,903 of Jones et al. issued Dec. 7, 1993; to U.S. Pat. No. 5,140,611 issued Aug. 18, 1992 to Jones et al. and to U.S. Pat. No. 5,127,004 of Lenihan et al. issued Jun. 30, 1992, all commonly assigned to the assignee of the present invention, for an example of the ACD in which the invention is preferably employed.

Referring now to FIG. 2, the preferred embodiment of the telephonic console is seen to include a alphanumeric LCD display 28, a keyboard 30, and a plurality of manually actuatable keys 17 with no indicators, a plurality of actuatable keys 37 with light indicators 38 and a call-waiting indicator 41. In addition, the telephonic console 10 has a slot 44 for releasable connection of a removable personality reset enable, or reset card 40, FIG. 3 of a voice card module 26, FIG. 4. The card 40 is preferably a nonvolatile 128k memory, such as memory card model No. MF3128 produced by Mitsubishi Electronics. The card 40 has sixty inputs 35 at one edge of the card which is releasably connectable to a suitable mating card connector module 26, FIG. 4. In some modes of operation a voice card at the same site as the card 40 has a PCM encoded voice message of the service agent thereon which is used to play messages to incoming callers when inserted in the releasable card connector associated with slot 44. For further details with regard to the voice card, reference should be made to the U.S. patent application Ser. No. 07/926,891 filed contemporaneously herewith and assigned to the same assignee of the present invention, application for patent of John M. Zdenek, David A. Marcinkiewicz, Andrew C. Capigatti and Earl L. Smith, entitled "Telephonic Console with Prerecorded Voice Message and Method."

In the preferred embodiment of the present invention, however, preferably the same slot 44 used for the voice card is also employed to receive the card 40 which has a code enabling a preset personality to be erased from a nonvolatile random access memory 32, FIG. 4, to be reprogrammed with information uniquely identifying one of the plurality of different personality. Reference should be made to U.S. Pat. No. 5,371,785 of David A. Marcinkiewicz entitled "Telephonic Console With Multipersonality Control Apparatus and Method", assigned to the assignee of the present invention. Alternatively, access to the nonvolatile ram 32, FIG. 4, is obtained through means of an access code entered on the keyboard 30 or by means of a manual switch or otherwise.

Referring now to FIG. 4, each of the telephonic consoles 10 includes a microprocessor 20, preferably an 80C32 model made by Intel, with its operating program stored in an associated erasable programmable read only memory, or EPROM 22, preferably a 32 k EPROM made by Catalyst Co. and having 32 k storage capacity. The console 10 of the preferred embodiment contains also necessary logic circuitry for the microprocessor 20 to communicate with the keyboard interface circuit 24, and the keyboard 30, the display 28 and the indicators 38, FIG. 2. The microprocessor 20 operates at a crystal clock frequency of 16,000 Mhz to insure proper baud rate. Paged memory mapping is preferably used to address I/O, console programmed hardware (not shown), internal and external SRAM's (not shown) at a voice card 40, if installed in the voice card module 26, comprising the card slot 44 and associated memory card connector described above. The LED keyboard interface contains 13 LED's which are multiplex, using a single 8-bit latch. The keyboard 30 is multiplex using a 4-bit right left and an 8-bit relatch in the keyboard interface electronics 24.

An LCD display preferably has an eighty character display consisting of two lines, forty characters each. The display is preferably accessed by a single data write operation.

The objective of the present invention is achieved through provision of a nonvolatile access memory, or NVRAM, 32 which is preferably a 1 kilobit (64/16) memory, such as the 1 kilobit NVRAM made by National Semiconductor Corp.

The parameters for all the different personalities of service agent, supervisory, billing agent and station master are stored in the EPROM 22 while which one of the personality will be adopted by the console is based upon the personality identification stored in the NVRAM 32 to control the console 10 to function accordingly. A selected set of parameters for the particular one of the personalities identified by personalities identification information of the NVRAM 32 is established by the microprocessor 20 as each function is called for. If a particular function is called for, from the keyboard 30, for instance, but the personality identified by NVRAM 32 does not authorize that function, the console 10 is disabled and will not perform the unauthorized function.

Figure 5:
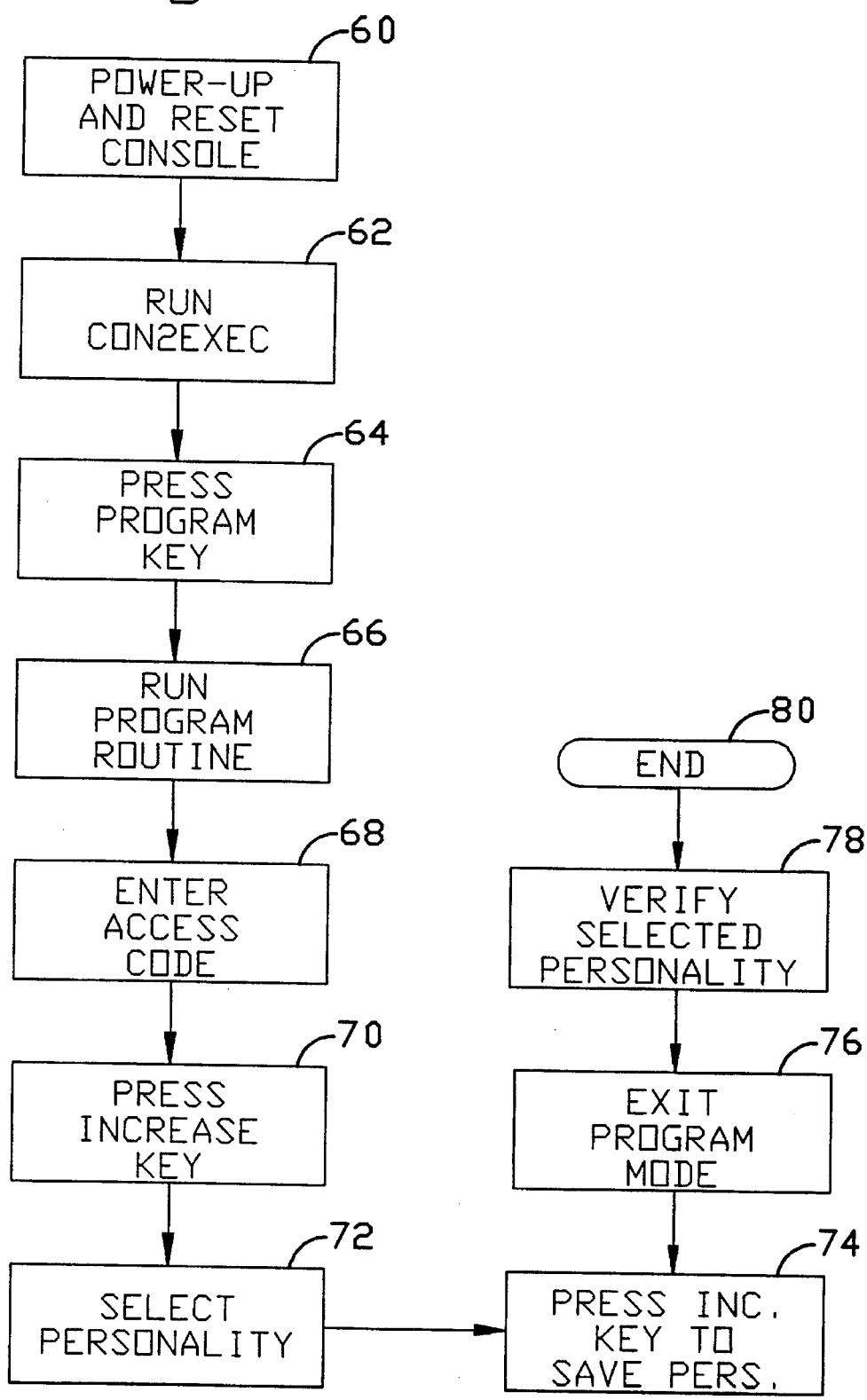
FIG. 5 is a flow chart illustrating the preferred mode for controlling the telephonic console to operate in accordance with the selected personality stored in the nonvolatile memory.

Referring to FIG. 5, a flow chart showing the manner in which different selected ones of the personality parameter sets are employed by the microprocessor is illustrated.

The first thing that needs to be programmed when the console 10, FIG. 4, is powered up is the personality. The personality once set in the NVRAM 32 makes the console 10 act as an agent, supervisor, billing representative, or station master. Once the personality of the console 10 is programmed a special personality reset card 40, FIG. 3, or an internal hardware short is required to reset the console unit 10, FIG. 2. With the personality reset card 40, FIG. 3, installed, the personality is cleared when power is first applied at power-up or initialization of the console as seen in step 60, FIG. 5. All program mode parameters are returned to the factory default settings. As a precondition, a handset or headset (not shown) must be plugged into the console 10, FIG. 2, before the program mode including the personality is entered.

Referring to FIG. 5, the programming or setting of the console personality is done after power-up of the console 10, FIG. 2, is completed by pressing the program key 50 on the keyboard 30 as seen in step 64. Once power-up is complete in step 60 the CON2EXEC routine located in the EPROM 22 is run in step 62 to control the functionality operation of the console. The KYBDFEAT subroutine operates in response to the key strokes or actuation of keys on the keyboard. The PROGRAM routine of KYBDFEAT is run in step 66 in response to the actuation of the Program key 50 on the keyboard 30, FIG. 2. The LCD 28 displays the message "Enter Setup Access Code" if the console 10 is reset to a default state. This is done through the LCD subroutine of CON2EXEC located in the microprocessor 20 EPROM 22, FIG. 4. Next, the user or operator of the console 10 enters his assigned access code on the numeric keys 46 on the keyboard 30 as seen in step 68, FIG. 5. In response to the entering of the correct assigned access code, the LCD 28, FIG. 2, displays at line one "PERSONALITY=NONE."

The operator of the console 10 presses the INCREASE key 48 in step 70 to select a personality in step 72, FIG. 5. With each actuation of the Increase key, line two of the LCD display 28 shows the different personalities: "Enhanced Agent," "Supervisory," "billing," "Station Master". To store the personality in the NVRAM the Send key 51 is actuated on the keyboard 30. The LCD display 28 shows the message on line two: "Do you want to save this? Inc=yes/Dec=No". The operator presses the Increase key 48 to save the selected personality in step 74, FIG. 5, which is written from the EPROM 22, FIG. 4, and stores in the NVRAM 32. The actuation of the Program key 50 is done to exit the program mode for the console personality selection operation in step 76, FIG. 5. The operator verifies the set personality of the console in step 78 by pressing the Program key 50, FIG. 2, again to re-enter the program mode. Line two of the LCD 28 displays "PROGRAM MODE" and line two displays the selected console personality. The process of setting and changing personalities in the NVRAM ends at step 80.

Reference should be made to the aforementioned U.S. patent applications of the assignee of this application filed contemporaneously herewith of David A. Marcinkiewicz entitled "Telephonic Console With Multipersonality Control Apparatus and Method", and of John M. Zdenek, David A. Marcinkiewicz, Andrew C. Capigatti and Earl L. Smith, entitled "Telephonic Console with Prerecorded Voice Message and Method" for further details about the telephonic console and related functions.

While a detailed description of the preferred embodiment of the invention has been given, it should be appreciated that many variations can be made thereto without departing from the scope of the invention as set forth in the appended claims.

We claim:

1. In a telephonic console having a visual display and means for making manual entries to control the console to perform a plurality of different functions in conjunction with an automatic call distribution system for interconnecting telephonic units of an external network with a plurality of telephone consoles, the improvement being a console personality programming apparatus, comprising:

a nonvolatile memory permanently positioned within the console for permanently storing a plurality of personality codes respectively associated with a plurality of different personalities;

means at the console for reading a selected one of the plurality of the personality codes;

means that the console responsive to the code reading means for controlling the console to function in accordance with the selected one of the plurality of personalities associated with the selected code; and wherein each of said plurality of different personalities have different authorized functions that can be performed on the console.

2. The telephonic console of claim 1 in which at least some of the personality codes respectively define different sets of relationships between a plurality of individually actuatable manual input switches at a keyboard of the console and the functions performed by the console in response to actuation of the different manual input switches.

3. The telephonic console of claim 2 in which the console personality programming apparatus includes a plurality of individual display elements for visually indicating a plurality of different conditions of the console, and at least some of the different personality codes respectively define different sets of relationships between the plurality of individual display elements of the console and the plurality of different conditions of the console.

4. The telephonic console of claim 3 in which at least some of the different personality codes respectively define different sets of relationships between actuation of the plurality of individually actuatable manual switches and the response thereto of at least one of the individual display elements.

5. The telephonic console of claim 1 in which the console programming personality apparatus of said console includes a plurality of individual display elements for visually indicating a plurality of different conditions of the console, and at least some of the different personality codes respectively define different sets of relationships between the plurality of individual display elements of the console and the plurality of different conditions of the console.

6. The telephonic console of claim 5 in which the nonvolatile memory is a programmable nonvolatile memory element and including means for setting the code during assembly.

7. The telephonic console of claim 6 in which the programmable nonvolatile memory element is an EPROM.

8. The telephonic console of claim 1 in which the personality code is a digital code.

9. The telephonic console of claim 1 in which said reading means includes a microprocessor programmed to operate to read the code.

10. The telephonic console of claim 1 in which the console controlling means includes means responsive to the code reading means for disabling the console from performing those functions not permitted by the personality associated with the read code.

11. The telephonic console of claim 1 in which said means for reading the personality code includes a microprocessor of the console programmed to read the code upon power up of the console.

12. The telephonic console of claim 1 in which the console controlling means includes a microprocessor at the console programmed to selectively enable the console to perform only certain functions associated with the personality of the read code.

* * * * *